G. P. ROBERTS.
DOUBLE LEVER BRAKE.
APPLICATION FILED JULY 24, 1919.
1,334,754.
Patented Mar. 23, 1920.
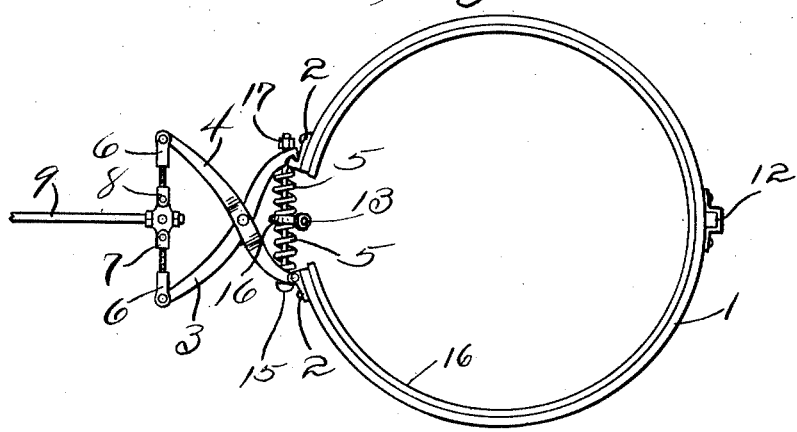
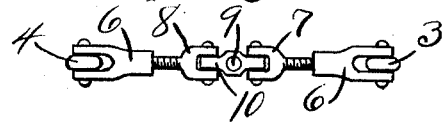
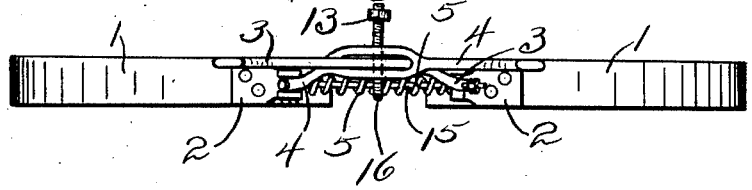
Witness
John E. Melton
Inventor
George P. Roberts
By A. L. Jackson
Attorney

UNITED STATES PATENT OFFICE.

GEORGE P. ROBERTS, OF FORT WORTH, TEXAS, ASSIGNOR OF ONE-HALF TO VICTOR SNYDER, OF FORT WORTH, TEXAS.

DOUBLE-LEVER BRAKE.

1,334,754.  Specification of Letters Patent.  Patented Mar. 23, 1920.

Application filed July 24, 1919. Serial No. 312,900.

*To all whom it may concern:*

Be it known that I, GEORGE P. ROBERTS, a citizen of the United States of America, residing at Fort Worth, in the county of Tarrant and State of Texas, have invented certain new and useful Improvements in Double-Lever Brakes, of which the following is a specification.

My invention relates to double lever brakes for vehicles, and the object is to provide brakes which will act with more power and in which the power applied will be more equally distributed. Other objects and advantages will be more fully explained in the following description and the invention will be more particularly pointed out in the claims.

Reference is had to the accompanying drawings which form a part of this application.

Figure 1 is a side elevation of the improved brakes. Fig. 2 is an enlarged detail view of the flexible connection of the pull rod. Fig. 3 is a face view or plan view of the brakes with the parts shown in Fig. 2 omitted.

Similar characters of reference are used to indicate the same parts throughout the several views.

The improved brake includes a band 1 with a lining 16 therefor. Brackets or connections 2 are riveted to the band 1 and levers 3 and 4 are pivotally connected to the brackets 2. The levers 3 and 4 are pivotally connected together at their crossing. The brake is mounted by means of a bracket 12 to be attached to some part of the frame of the vehicle and by a rod 13 also to be connected to the frame of the vehicle. The rod 13 also serves as a centering device. A bearing 16 is rigid with the rod 13 and a rod 15 runs loosely through the bearing 16 and springs 5 are mounted on the rod 5 for maintaining tension of the levers. A nut 17 may be screwed up more or less on the rod 15 to regulate the tension of the springs 5. The outer ends of the levers 3 and 4 are connected by pivotal connecting members which constitute a flexible connection. Members 6 are pivotally connected to the levers 3 and 4 and members 7 and 8 are screwed into the members 6 and are pivotally connected to a pull rod connection 10. The pull rod 9 is rigidly connected to the yoke or connection 10. The springs 5 will prevent the appliance of the brake when brakes are not necessary. It its apparent that with such construction and disposition of the brake levers, the distribution of the brake power is more evenly applied and the two levers will make the brakes more powerful.

What I claim, is,—

1. A double lever brake comprising an open band and a lining therefor, means for mounting said band on the frame of a vehicle including a centering rod, a pair of levers pivotally connected together and pivotally connected to the ends of said band at their power ends, tensioning means including springs bearing against the power ends of said levers and seats for said springs rigid with said centering rod coöperating with said centering rod for regulating the distribution and application of the power, and a pull rod having flexible connections with the operating ends of said levers.

2. A double lever brake comprising an open band and a lining therefor, means for mounting said band on the frame of a vehicle including a centering rod, a pair of levers pivotally connected together and pivotally connected to the ends of said band at their power ends, a bearing on said centering rod, a rod running through said bearing and loosely through the ends of said levers at their power end, springs mounted on said last mentioned rod between said levers and said bearing, a flexible connection for the work ends of said levers, and a pull rod connected to the middle point of said flexible connection.

In testimony whereof, I set my hand, this 17th day of June, A. D. 1919.

GEORGE P. ROBERTS.